United States Patent [19]

Madeleine et al.

[11] Patent Number: 4,925,764

[45] Date of Patent: May 15, 1990

[54] POSITIVE SOLID BLOCK TONER

[75] Inventors: Dennis G. Madeleine, Cherry Hill, N.J.; Carol A. Senkler, Hockessin; Loretta A. Grezzo Page, Newark, both of Del.

[73] Assignee: E. I. Du Pont de Nemours & Co., Wilmington, Del.

[21] Appl. No.: 288,917

[22] Filed: Dec. 23, 1988

[51] Int. Cl.$^5$ ............................. G03G 9/08; G03G 9/10
[52] U.S. Cl. ..................................... 430/110; 430/106; 430/904
[58] Field of Search .......................... 430/106, 110, 904

[56] References Cited

U.S. PATENT DOCUMENTS

| | | | |
|---|---|---|---|
| 3,893,935 | 7/1975 | Jadwin et al. | 430/110 |
| 4,134,760 | 1/1979 | Gibson et al. | 430/110 |
| 4,299,898 | 11/1981 | Williams et al. | 430/106 |
| 4,355,167 | 10/1982 | Ciccarelli | 546/255 |
| 4,371,601 | 2/1983 | Ciccarelli | 430/110 |
| 4,378,419 | 3/1983 | Ciccarelli | 430/110 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,568,624 | 2/1986 | Ohshima et al. | 430/109 |
| 4,581,312 | 4/1986 | Nakahara et al. | 430/102 |
| 4,588,795 | 5/1986 | Dicker et al. | 526/192 |
| 4,621,039 | 11/1986 | Ciccarelli et al. | 430/106 |
| 4,656,226 | 4/1987 | Hutchins et al. | 525/93 |
| 4,755,563 | 7/1988 | West | 525/287 |
| 4,840,863 | 6/1989 | Otsu et al. | 430/110 |

FOREIGN PATENT DOCUMENTS

| | | | |
|---|---|---|---|
| 59-26741 | 2/1984 | Japan | 430/109 |
| 1324745 | 4/1971 | United Kingdom | |

*Primary Examiner*—Paul R. Michl
*Assistant Examiner*—Jeffrey A. Lindeman
*Attorney, Agent, or Firm*—Richard H. Burgess

[57] ABSTRACT

Positively chargeable toner containing block copolymers for electrostatic reprography, giving improved compatibility with the toner resin. Preferred are block copolymers of styrene with methyl methacrylate and butyl methacrylate as one block and dimethylaminoethyl methacrylate as the other block, quaternized with methyl tosylate or benzyl chloride.

13 Claims, No Drawings

POSITIVE SOLID BLOCK TONER

BACKGROUND

This invention concerns toners containing block copolymer charge directors. More specifically it concerns such charge control agents which are preferably quaternized.

Several patents exist in the field of charge directors in toners.

In U.S. Pat. No. 4,355,167 Ciccarelli (1982) there are disclosed certain polymeric charge control agents for electrostatic toner compositions that are random copolymers of the formula [AxBy]z wherein A is a segment selected from vinyl monomers, B is a quaternary salt segment, x and y are numbers representing mole fractions of A and B, the sum of x and y being equal to 1, and Z represents the degree of polymerization. Free radical polymerization techniques are said to result in a telomeric quaternary salt having a number average molecular weight of from about 1,000 to about 10,000.

In U.S. Pat. Nos. 4,371,601 Ciccarelli (1982) and 4,378,419 Ciccarelli (1983) there are disclosed positively charged dry developer compositions containing such polymeric charge control agents.

In U.S. Pat. No. 4,621,039 Ciccarelli et al (1986) there are disclosed related toner compositions with fast admixing characteristics comprising certain polymeric charge control agents for electrostatic toner compositions that are homopolymers of amine-containing monomers, copolymers containing amine monomers, polymeric amines, polymeric quaternary ammonium compounds, telomeric amines and telomeric quaternary ammonium salt compositions, wherein the charge enhancing additives are associated with the pigment particles. An essential disclosure of Patent No. '039 is that the charge agent is associated with the pigment particles. Association was affected by mixing the pigment particles and charge control agent prior to adding the resulting mixture to the polymer resin particles required for formation of the toner composition. This Patent further teaches that it is necessary to disperse the pigment particles within the polymeric resin, and without proper dispersion, charge sharing does not result.

In addition to the advantages of proper dispersion of the pigment particles within the toner resin taught by '039, in some instances, particularly where color pigments are used, proper dispersion of the pigment is also desirable in optimizing color quality in the xerographic image.

U.S. Pat. No. 4,656,226 Hutchins et al (1987) teaches the preparation of AB block copolymers suitable for use as pigment dispersants, by group transfer polymerization techniques (GTP) such as those disclosed in U.S. Pat. Nos. 4,417,034 (1983) and 4,508,880 (1985) both to Webster, and 4,414,372 (1983) and 4,524,196 (1985) both to Farnham et al, and 4,588,795 Dicker et al (1986). Quaternized block copolymers, preferably made by GTP, are disclosed in U.S. Pat. No. 4,755,563 (1988) West.

Quaternary ammonium salts as charge control agents in toners are taught in U.S. Pat. No. 3,893,935 Jadwin et al (1975).

Pressure-fixable toners containing copolymers of styrene and dimethylaminoethylmethacrylate are taught in U.S. Pat. No. 4,581,312 Nakahara et al (1986).

Toners containing block copolymerized styrene and dyes are known from U.S. Pat. No. 4,568,624 Ohshima et al (1986).

The above patents are hereby incorporated herein by reference. They provide relevant background for the present invention, but none suggest ways or means of further improving triboelectric charge and compatibility of charge directors with the toner resin.

There is a need for improved developer compositions which contain toner and carrier particles, wherein the toner particles charge positively. Further, there is a need for developer compositions which can be used to render visible electrostatic latent images containing negative charges on the photoreceptor surface, and which compositions will transfer effectively electrostatically from such a photoreceptor surface to plain bond paper without causing blurring or adversely affecting the quality of the image. Moreover, there is a need to provide charge control agents which are even more compatible with the toner resin, the charge control agent having exceptional dispersibility while exhibiting higher uniform and stable net toner charge. Further, there is a need for charge control agents that facilitate the dispersion of the pigment within the toner resin so that charge exchange is promoted and color quality is optimized.

SUMMARY OF THE INVENTION

The present invention provides a positively chargeable solid or dry toner composition comprising resin particles, pigment particles and charge enhancing additive, the additive being selected from the group consisting of block polymers of the type AB, BAB, ABA, wherein B is a segment that is compatible with the resin particles, the monomer units of said A segment, when homopolymerized, having a polarity which is greater than the polarity of the monomer units of said B segment when homopolymerized, (a) A is one or two blocks which comprise about from 0.5 to 50% by weight of the total copolymer, having a number average molecular weight of about from 200 to 10,000 and prepared from at least one monomer selected from compounds of the general form $CH_2=CCH_3CO_2R$ and $CH_2=CHCO_2R$ wherein R is alkyl of 1–20 carbon atoms, the block further contains at least 2 pendant ionic moieties in the block at the terminal end of R of the general formula $-Q(R_1)_mX$ wherein Q is selected from N, P, and S; $R_1$ are independently selected from alkyl of 1–20 carbon atoms, phenyl, benzyl or substituted phenyl, m is 3 when Q is N or P, and m is 2 when Q is S, and X is selected from halides and conjugate bases of organic acids, or $Ris-Q(R_1)_{m-1}$ when no halide or conjugate bases of organic acids are present, and (b) B is one or two blocks which are the balance of said copolymer, having a number average molecular weight of about from 200 to 100,000 and prepared from monomers selected from styrene, substituted styrene, butadiene or compounds of the general formulas $CH_2=CCH_3CO_2R$ and $CH_2=CHCO_2R$, wherein R is alkyl of 1–20 carbon atoms.

DETAILED DESCRIPTION

Surprisingly, it has been found that block copolymers of the invention permit greater compatibility with the binder polymers of toners, especially styrenic binders, than corresponding random copolymers suggested by the prior art.

Also, higher triboelectric charging can be obtained, more conspicuously with uncoated ferrite carrier particles, less conspicuously with ferrite carrier particles coated with fluoropolymer resins.

Preferably, the application of toners of the invention is in accordance with the teachings of U.S. Pat. No. 4,371,601, and the preparation of the charge directing block copolymers is in accordance with the teachings of U.S. Pat. Nos. 4,755,563 and 4,656,226.

Block copolymers can also be synthesized by cationic polymerization, but side reactions can dominate the product if low temperatures are not used.

Preferably, methacrylate and acrylate monomers can be copolymerized into block copolymers by group transfer polymerization as described in Webster, U.S. Pat. No. 4,508,880 at column 8, lines 4 to 58. Monomers which are preferred for the A block of the copolymer, containing the pendant groups, include dimethyl aminoethyl methacrylate and diethyl aminoethyl methacrylate. Monomers which are preferred for the B block of the copolymers include methyl methacrylate, butyl methacrylate and 2-ethylhexyl methacrylate.

Block copolymers can also be formed by free radical polymerization wherein the initiation unit is comprised of two different moieties which initiate polymerization at two distinctly different temperatures. However, this method suffers from contamination of the block copolymers with homopolymer and coupled products.

The block copolymers of the present invention can also be prepared by conventional anionic polymerization techniques, in which a first block of the copolymer is formed, and, upon completion of the first block, a second monomer stream is started to form a subsequent block of the polymer. The reaction temperatures using such techniques should be maintained at a low level, for example, 0° to −40° C., so that side reactions are minimized and the desired blocks, of the specified molecular weights, are obtained.

Monomers which are illustrative for the A block of the copolymer made by anionic polymerization include 4-vinyl pyridine, 2-vinyl pyridine, 3-vinyl pyridine, dimethyl amino ethyl methacrylate, t-butyl aminoethyl methacrylate, and the like. Alkyl substituted vinyl pyridines may be substituted for the vinyl pyridines. Typical alkyl substituents include methyl, ethyl, propyl, butyl, pentyl, hexyl, and the like. Monomers which are preferred for the B block of the block copolymer include styrene, alkyl and halo-substituted styrenes, butadienes, acrylates and methacrylates.

The pendant ionic moieties have the general formula -Q(R$_1$)$_m$X, wherein Q is selected from N, P, and S, R$_1$ are independently selected from alkyl or alkyl ether of 1-20 carbon atoms, phenyl or substituted phenyl, m is 3 when Q is N or P, and m is 2 when Q is S, and X is selected from halides and conjugate bases or organic acids. Preferably, Q is nitrogen, and X is selected from the group consisting of carboxylates, sulfonates, phosphates, chlorides, sulfates, tetrafluoroborates and tosylates.

The amount of charge control agent added to the toner ranges from about 0.1% by weight to about 35% by weight and preferably from about 0.1% by weight to about 15% by weight. The amount of charge control agent employed can be outside these ranges providing that such amounts accomplish the objectives of the present invention.

Numerous methods may be employed to produce the toner of the present invention, one preferred method involving melt blending the resin, the pigment and the charge control agent, followed by mechanical attrition. Other methods include those well known in the art such as spray drying and dispersion polymerization. For example, a solvent dispersion of a resin, pigment and charge control agent are spray dried under controlled conditions, thereby resulting in the desired product. Such a toner prepared in this manner results in a positively charged toner in relationship to the carrier materials used.

Incompatibility of the charge agent with toner resin can result in little or no charge agent in some of the toner particles. This is particularly true of the smaller toner particles in the particle size distribution. As a result, these smaller particles will not acquire the correct sign during the admixing process and begin to accumulate in the machine. Also, these "wrong sign" particles can add to the background during xerographic transfer process. Use of the block copolymer charge control agents resulted in few of the "wrong sign" particles being generated. It appears that the block polymeric charge enhancing additives are more compatible with a styrene/butadiene resin than commercially available additives. This greater degree of compatibility results in better mixing and more of the toner particles having the correct sign.

In the following examples and comparisons, parts, percentages and proportions are by weight except where indicated otherwise.

EXAMPLE I

Block Copolymer MMA/BMA//DMAEM Dp 15/15//4

Synthesized By Group Transfer Polymerization

A reaction vessel was charged with 822 g tetrahydrofuran (THF), 3.9 g p-xylene, 32.4 g 1-methoxy-1-trimethylsiloxy-2-methylpropene ("initiator"), and 1.4 mL 1M tetrabutylammonium 3-chlorobenzoate in acetonitrile ("catalyst"). To prepare a B block, two feeds were begun simultaneously. The first feed contained a mixture of 287.5 g of methyl methacrylate and 393.2 g of butyl methacrylate, and was added over 70 minutes. The second feed contained 1.4 mL of 1 M catalyst in 4.5 mL of THF and was added over 2 hours. Twenty-five minutes after the first feed was finished the A block was formed by adding 114.1 g of dimethylaminoethyl methacrylate over ten minutes. The reaction was terminated by adding 60 grams of methanol to the reaction mixture.

To quaternize the amine groups in the resulting block copolymer, 89.1 g of benzyl chloride and 404 g of isopropanol was added to the reaction flask. The sample was brought to reflux temperature and the extent of quaternization was monitored by amine titration. The decrease in amine number indicated that the reaction was 91.7% complete.

Methyl tosylate has also been used to form the quaternary form of the block copolymer. In such cases, the amine groups in the block copolymer solution are reacted with a stoichiometric amount of methyl-p-toluene sulfonate. A quantity of isopropanol equal to about 50% of the solution weight is added to the solution and refluxed until the reaction is essentially completed. Both the benzyl chloride and methyl tosylate forms of the polymer can be isolated by precipitation in hexane.

EXAMPLE II

Block Copolymer MMA/BMA//DMAEM Dp 10/30//12

Synthesized By Group Transfer Polymerization

A reaction vessel was charged with 761 g tetrahydrofuran (THF), 3.5 g p-xylene, 20.3 g -methoxy-1-trimethylsiloxy-2-methylpropene ("initiator"), and 0.79 mL IM tetrabutylammonium 3-chlorobenzoate in acetonitrile ("catalyst"). To prepare the B block, two feeds were begun simultaneously. The first feed contained a mixture of 138.6 g of methyl methacrylate and 459.7 g of butyl methacrylate, and was added over 65 minutes. The second feed contained 0.79 mL of 1M catalyst in 4.5 mL of THF and was added over 2 hours. One hour after the first feed was finished the A block was formed by adding 193.5 g of dimethylaminoethyl methacrylate over eight minutes. The reaction was terminated 215 minutes after the start of the first feed by adding 40 grams of methanol to the reaction mixture.

To quaternize the amine groups in the resulting block copolymer, 155.7 g of benzyl chloride and 387 g of isopropanol was added to the reaction flask. The sample was brought to reflux temperature and the extent of quaternization was monitored by amine titration. The decrease in amine number indicated that the reaction as 92.5% complete after 3 hours of reaction time at reflux temperature.

Methyl tosylate can also be used to form the quaternary form of the block copolymer. In such cases, the amine groups in the block copolymer solution are reacted with a stoichiometric amount of methyl-p-toluene sulfonate. A quantity of isopropanol equal to about 50% of the solution weight is added to the solution and refluxed until the reaction is essentially completed. Both the benzyl chloride and methyl tosylate forms of the polymer can be isolated by precipitation in hexane.

COMPARISON I

Random Copolymer MMA/BMA/DMAEM Dp 15/15/4

Synthesized By Group Transfer Polymerization

A random copolymer of essentially the same composition as the block copolymer listed in Example 1 was synthesized by charging a reaction vessel with 304.2 g of THF, 3.4 g of p-xylene, 12.5 g of 1-methoxy-1-trimethylsiloxy-2-methylpropene ("initiator") and 0.35 mL of 1M tetrabutylammonium 3-chlorobenzoate ("catalyst") in acetonitrile. Two feeds were begun simultaneously. The first feed contained a mixture of 109.7 g of MMA, 150.8 g BMA and 46.9 g DMAEM, and was added over 45 minutes. The second feed contained 0.35 mL of catalyst and 4.5 mL of THF, and was added over 90 minutes. 150 minutes after the start of the first feed, the reaction was terminated by adding 16 g methanol. The amine copolymer can be isolated by precipitation in hexane.

To quaternize the amine groups in the resulting random copolymer solution, a portion (324.3 g) of the solution was added to 19.0 g of benzyl chloride and 47.3 g of isopropanol. The sample was brought to reflux temperature and the extent of quaternization was monitored by amino titration. The decrease in amine number indicated that the reaction was 94.7% completed after 18 hours of reaction at reflux temperature.

Methyl tosylate can also be used to form the quaternary form of the random copolymer. In such cases, the amine groups in the copolymer solution are reacted with a stoichiometric amount of methyl-p-toluene sulfonate. A quantity of isopropanol equal to about 50% of the solution weight is added to the solution and refluxed until the reaction is essentially completed. Both the benzyl chloride and methyl tosylate forms of the polymer can be isolated by precipitation in hexane.

COMPARISON II

Random Copolymer MMA/BMA/DMAEM

Synthesized By Free Radical Polymerization

A random copolymer of essentially the same composition as the block copolymer listed in Example I was synthesized by charging a reaction vessel with 135.0 g of toluene. The solvent was brought to reflux temperature and a mixture of 135 g toluene, 111 g methyl methacrylate, 143 g n-butylmethacrylate, 46.5 g dimethylaminoethyl methacrylate and 3.9 g of Vazo 67 (a free radical initiator) was added over 180 minutes. A second feed consisting of 30 g toluene and 6.6 g Vazo 67 was added simultaneously with the first feed over 225 minutes. After complete addition of the second feed, the mixture was refluxed for an additional 60 minutes. A portion of this solution was precipitated into hexane and dried.

To quaternize the amine groups in the random copolymer solution, a portion (280 g) of the solution was added to 17.3 g of benzyl chloride and 300 g of isopropanol. The solution was refluxed for 400 minutes and the extent of quaternization as monitored by amine titration. The decrease in amine number indicated that the reaction was 97% complete.

EXAMPLE III

Triboelectric Charge Of Toners Formulated With Block Copolymers Of Example I The amine, benzyl chloride and methyl tosylate block copolymer solutions of Example I were precipitated in excess hexane (1 part solution to 10 parts hexane) and dried in a vacuum oven overnight. A toner composition was prepared of each of the charge control agents by melt blending followed by mechanical attrition, 2 parts of the precipitated block copolymer with 8 parts of Black Pearls L carbon black from Hercules and 90 parts of a styrene/n-butylmethacrylate resin, which is 58% by weight styrene and 42% by weight n-butylmethacrylate. Three parts of each toner and 97 parts of an uncoated ferrite carrier were blended into separate developer compositions. The developer compositions were roll milled and after twenty minutes of roll milling the triboelectric charge on the toner was measured using a Vertex Model T-100 Triboelectric Tester. The tribotester measurements are made by loading the developer composition into a Faraday cage and using a stream of air to remove charged particles that are finer than the cage screen. The opposite net charge remaining on the developer composition is neutralized and measured. The charge on the toner composition containing the amine block copolymer was found to be 7.9 $\mu$C/gram (microcoulombs per gram). The charge on the toner compositions containing the benzyl chloride and methyl tosylate block copolymers was found to be 15.4 and 15.6 $\mu$C/gram, respectively.

Three parts of the toner formulation containing the benzyl chloride modified block copolymer and 97 parts of a fluoropolymer coated carrier were also blended into a developer composition. The developer was roll milled and after twenty minutes of roll milling the triboelectric charge on the toner was measured and found to be 28.3 µC/gram.

EXAMPLE IV

Triboelectric Charge Of Toners Formulated With Block Copolymers Of Example II

The amine, benzyl chloride and methyl tosylate block copolymer solutions of Example II were precipitated in excess hexane (1 part solution to 10 parts hexane) and dried in a vacuum oven overnight. A toner composition was prepared of each of the charge control agents by melt blending followed by mechanical attrition, 2 parts of the precipitated block copolymer with 8 parts of Black Pearls L carbon black and 90 parts of a styrene/n-butylmethacrylate resin, which is 58% by weight styrene and 42% by weight n-butylmethacrylate. Three parts of each toner and 97 parts of an uncoated ferrite carrier were blended separately into developer compositions. The developer compositions were roll milled and after twenty minutes of roll milling the triboelectric charge on the toner was measured as in Example III. The charge on the developer composition containing the amine block copolymer was found to be 13.3 µC/gram (microcoulombs per gram). The charge on the developer compositions containing the benzyl chloride and methyl tosylate block copolymers was found to be 15.7 and 10.7 µC/gram, respectively.

COMPARISON III

Triboelectric Charge Of Toners Formulated With Random Copolymers Of Comparison I The amine and benzyl chloride random copolymer solutions of Comparison I were precipitated in excess hexane (1 part solution to 10 parts hexane) and dried in a vacuum oven overnight. A toner composition was prepared of each of the charge control agents by melt blending followed by mechanical attrition, 2 parts of the precipitated block copolymer with 8 parts of Black Pearls L carbon black and 90 parts of a styrene/n-butylmethacrylate resin, which is 58% by weight styrene and 42% by weight n-butylmethacrylate. Three parts of each toner and 97 parts of an uncovered ferrite carrier were blended into separate developer compositions. The developer compositions were roll milled and after twenty minutes of roll milling the triboelectric charge on the toner was measured using a Vertex Model T-100 Triboelectric Tester as in Example IV. The charge on the developer composition containing the amine random copolymer was found to be 5.5 µC/gram (microcoulombs per gram). The charge on the developer compositions containing the benzyl chloride random copolymer was found to be 9.2 µC/gram.

Three parts of the toner formulation containing the benzyl chloride modified block copolymer and 97 parts of a fluoropolymer coated carrier were also blended into a developer composition. The developer was roll milled and after twenty minutes of roll milling the triboelectric charge on the toner was measured and found to be 26.2 µC/gram.

Comparision IV

Triboelectric Charge Of Toners Formulated With Random Copolymers Of Comparison II The amine and benzyl chloride random copolymer solutions of Comparison II were precipitated in excess hexane (1 part solution to 10 parts hexane) and dried in a vacuum oven overnight. A toner composition was prepared of each of the charge control agents by melt blending followed by mechanical attrition, 2 parts of the precipitated block copolymer with 8 parts of Black Pearls L carbon black and 90 parts of a styrene/n-butylmethacrylate resin, which is 58% by weight styrene and 42% by weight n-butylmethacrylate. Three parts of each toner and 97 parts of a fluoropolymer coated carrier were blended into separate developer compositions. The developer compositions were roll milled and after twenty minutes of roll milling the triboelectric charge on the toner was measured using a Vertex Model T-100 Triboelectric Tester. The charge on the developer composition containing the amine random copolymer was found to be 24.1 µC/gram (microcoulombs per gram). The charge on the developer compositions containing the methyl tosylate random copolymer was found to be 27.6 µC/gram.

EXAMPLE V

Compatibility Of Block Copolymers Of Example I With Toner Resin

The benzyl chloride block copolymer solution of Example I was precipitated in excess hexane (1 part solution to 10 parts hexane) and dried in a vacuum oven overnight. 0.5 grams of the block copolymer was added to 25 grams of a styrene/butadiene random copolymer typically used in toner formulations. The mixture was dissolved in 100 grams of toluene and films were cast at a thickness of 0.007 in. on glass plates. The film was allowed to dry overnight and then examined at 1000X with an optical microscope. At this magnification, no phase structure could be seen and the mixture of the two polymers appeared to be homogenous. This result indicates that the benzyl chloride block copolymer is essentially fully compatible with the styrene/butadiene resin. Phase separation, if any, between the two polymers, which is indicative of incompatibility, must be on a scale smaller than the resolving power of the microscope (<0.5 µm). The superior compatibility of the benzyl chloride block copolymer charge control agent in the styrene/butadiene matrix suggests that the benefits of compatibility on image quality will be observed with this charge control agent in styrene/butadiene.

Films were also prepared as described above, the only change being that a copolymer resin comprised of 58% styrene and 43% n-butylmethacrylate was used instead of styrene/butadiene resin. Similar results were also observed; that is, no phase structure could be seen at 1000X magnification, and the mixture of the two polymers appeared to be homogenous. The superior compatibility of the benzyl-chloride-block copolymer in the styrene/n-butylmethacrylate resin suggests that the benefits of compatibility on image quality will also be observed in this formulation.

COMPARISON V

Incompatibility Of Random GTP Copolymers Of Comparison I With Toner Resin

The benzyl chloride random copolymer solution of Comparison I was precipitated in excess hexane (1 part solution to 10 parts hexane) and dried in a vacuum oven overnight. 0.5 grams of the block copolymer was added to 25 grams of a styrene/butadiene random copolymer typically used in toner formulations. The mixture was dissolved in 100 grams of toluene and then films were cast at a thickness of 0.007 in. on glass plates. The film was allowed to dry overnight and then examined at 1000X with an optical microscope. At this magnification, dark circular domains of the random copolymer in the styrene/butadiene matrix could be seen clearly. These domains populated the entire film, and appeared to be 2 to 8 micrometers in diameter. This result indicates that the benzyl chloride random copolymer made by group transfer polymerization is not as compatible with the styrene/butadiene resin as the block copolymer of the same composition discussed in Example V. Phase separation between the two polymers is quite evident. The benefits of resin/charge control agent compatibility on image quality will be less than in the case of the random copolymer charge control agent as the block copolymer charge control agent.

Films were also prepared as described above, the only change being that a copolymer resin comprised of 58% styrene/43% n-butylmethacrylate was used instead of the styrene/butadiene resin. Similar results were also observed; that is, the random copolymer of Comparison I appeared to be incompatible and domains of charge control agent approximately 2–4 micrometers in diameter populated the styrene/n-butylmethacrylate matrix when observed with a microscope at 1000X magnification.

copolymer charge control agent as the block copolymer charge control agent.

Films were also prepared as described above, the only change being that a copolymer resin comprised of 58% styrene/42% n-butylmethacrylate was used instead of the styrene/butadiene resin. Similar results were also observed; that is, the random copolymer of Comparison II appeared to be incompatible and domains of charge control agent 1–3 micrometers populated the styrene/n-butylmethacrylate matrix when observed with a microscope at 1000X magnification.

DISCUSSION OF EXAMPLES

For comparison of the results from the examples, note that Example V shows superior compatibility for block copolymers of the invention compared with random copolymers made by GTP in Comparison I and by free radical polymerization in Comparison II.

Concerning triboelectric charging, the following table shows that block GTP polymers of Example III are superior on uncoated ferrite to random GTP polymers of Comparison III, and on coated ferrite they are slightly superior to random group transfer polymers of Comparison III. Example IV illustrates alternative block GTP proportions.

| Example/Comparison | Composition | Amine/Quat. | Charge Density Uncoated Ferrite | Charge Density Coated Ferrite |
|---|---|---|---|---|
| Example III | block by GTP MMA/BMA//DMAEM 15/15//4 | amine benzyl Cl Me tosylate | 7.9 15.4 15.6 | — 28.3 — |
| Example IV | block by GTP MMA/BMA//DMAEM 10/30//12 | amine benzyl Cl Me tosylate | 13.3 15.7 10.7 | — — — |
| Comparison III | Example III but random by GTP | amine benzyl Cl Me tosylate | 5.5 9.2 — | — 26.2 — |
| Comparison IV | Example IV but random by free radical | amine benzyl Cl Me tosylate | — — — | 24.1 — 27.6 |

COMPARISON VI

Incompatibility Of Random Free-Radical Copolymers Of Comparison II With Toner Resin The benzyl chloride random copolymer solution made by free radical polymerization in Comparison II was precipitated in excess hexane (1 part solution to 10 parts hexane) and dried in a vacuum oven overnight. 0.5 grams of the block copolymer was added to 25 grams of a styrene/butadiene random copolymer typically used in toner formulations. The mixture was dissolved in 100 grams of toluene and then films were cast at a thickness of 0.007 in. on glass plates. The film was allowed to dry overnight and then examined at 1000X with an optical microscope. At this magnification, dark circular domains of the random copolymer in the styrene/butadiene matrix could be seen clearly. These domains populated the entire film, and appeared to be 1 to 10 micrometers in diameter. This result indicates that the benzyl chloride random copolymer made by free radical polymerization is not as compatible with the styrene/butadiene resin as the block copolymer of the same composition discussed in Example V. Phase separation between the two polymers is quite evident. The benefits of resin/charge control agent compatibility on image quality will not be as pronounced in the case of the random

We claim:

1. A positively chargeable solid toner composition comprising resin particles, pigment particles and charge enhancing additive,
   the additive being selected from the group consisting of block polymers of the type AB, BAB, ABA, wherein B is a segment that is compatible with the resin particles, the monomer units of said A segment, when homopolymerized, having a polarity which is higher than the polarity of the monomer units of said B segment when homopolymerized,
   (a) A is one or two blocks which comprise about from 0.5 to 50% by weight of the total copolymer, having a number average molecular weight of about from 200 to 10,000 and prepared from at least one monomer selected from compounds of the general form $CH_2{=}CCH_3CO_2R$ and $CH_2{=}CHCO_2R$ wherein R is alkyl of 1–20 carbon atoms, the block further contains at least 2 pendant ionic moieties in the block at the terminal end of R of the general formula $-Q(R_1)_m X$ wherein Q is selected from N, P, and S; $R_1$ are independently selected from alkyl of 1–20 carbon atoms, phenyl, benzyl or substituted phenyl, m is 3 when Q is N or P, and m is 2 when Q is S, and X is selected from halides and conjugate bases of organic acids, or $Ris-Q(R_1)_{m-1}$ when no halide or conjugate bases of organic acids are present, and (b) B is one or two blocks which are the balance of said copolymer, having a number average molecular weight of about from 200 to 100,000 and prepared from monomers selected from styrene, substituted styrene, butadiene or compounds of the general formulas $CH_2=CCH_3CO_2R$ and $CH_2=CHCO_2R$, wherein R is alkyl of 1-20 carbon atoms.

2. The toner of claim 1, wherein Q in the pendant ionic groups is N.

3. The toner of claim 1, wherein pendant ionic groups of the A block are derived from monomers selected from the group consisting of
dimethylaminoethyl methacrylate,
diethylaminoethyl methacrylate,
2-vinyl pyridine,
4-vinyl pyridine, and
3-vinyl pyridine.

4. The toner of claim 1, wherein B block consists of copolymer comprising monomer selected from the group consisting of of styrene, methyl methacrylate or butyl methacrylate.

5. The toner of claim 1, wherein X is conjugate base of organic acid which are selected from carboxylates, sulfonates and phosphates.

6. The toner of claim 1, wherein X is selected from the group consisting of chloride and tosylate.

7. An improved toner composition in accordance with claim 1, wherein the pigment particles are carbon black.

8. An improved toner composition in accordance with claim 1, wherein the resin particles are selected from the group consisting of styrene acrylate copolymers, styrene methacrylate copolymers, styrene butadiene copolymers, acrylate and methacrylate copolymers and polyesters.

9. A developer composition comprised of the toner composition of claim 1, and carrier particles.

10. A developer composition in accordance with claim 9, wherein the carrier particles consist of a steel core coated with a polymeric composition.

11. A developer composition in accordance with claim 9, wherein the pigment particles are carbon black.

12. A developer composition in accordance with claim 9, wherein the pigment particles are cyan, magenta, yellow, red, blue, green or mixtures thereof.

13. A developer composition in accordance with claim 9, wherein the resin particles are selected from the group consisting of styrene acrylate copolymers, styrene methacrylate copolymers, styrene butadiene copolymers, and polyesters.

* * * * *